UNITED STATES PATENT OFFICE.

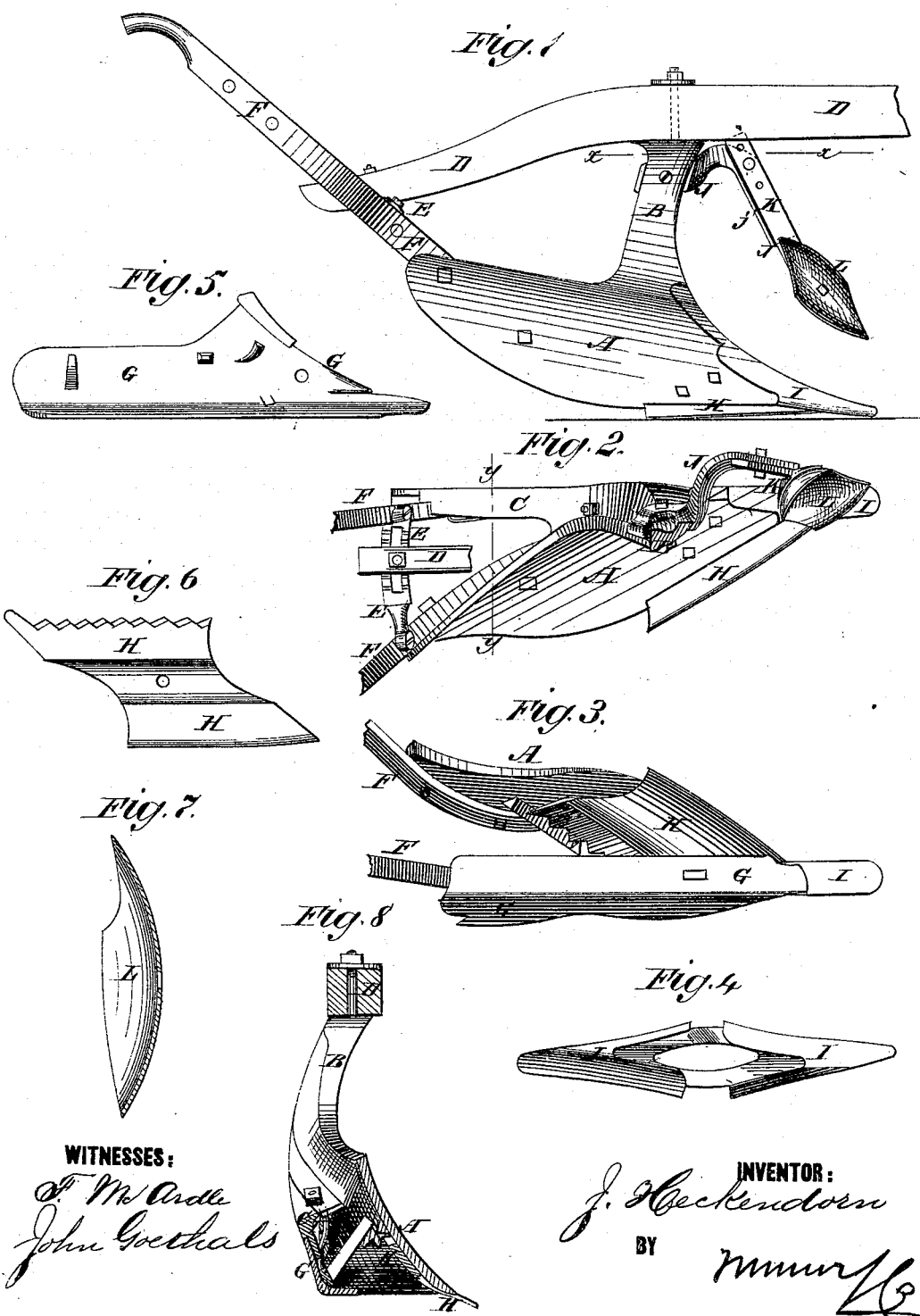

JACOB HECKENDORN, OF ANN ARBOR, MICHIGAN.

IMPROVEMENT IN PLOWS.

Specification forming part of Letters Patent No. 179,699, dated July 11, 1876; application filed April 18, 1876.

*To all whom it may concern:*

Be it known that I, JACOB HECKENDORN, of Ann Arbor, in the county of Washtenaw and State of Michigan, have invented a new and useful Improvement in Plows, of which the following is a specification:

Figure 1 is a side view of a plow to which my improvement has been applied. Fig. 2 is a horizontal section of the same, taken through the line $x\ x$, Fig. 1. Fig. 3 is a bottom view of the same. Fig. 4 is a detail view of the point. Fig. 5 is a detail view of the mold-board. Fig. 6 is a detail view of the share. Fig. 7 is a longitudinal section of the skiver. Fig. 8 is a vertical section of the plow, taken through the line $y\ y$, Fig. 2.

Similar letters of reference indicate corresponding parts.

The object of this invention is to connect a skiver, jointer, or colter with a plow in such a way that its position will not be changed by the lateral adjustment of the beam, that it will leave space for the ready escape of rubbish, that it may be adjusted to work deeper or shallower in the ground, and will throw the rubbish into such a position that it will be covered by the furrow-slice.

The invention will first be described in connection with drawing, and then pointed out in the claims.

A is the mold-board. B is the standard, and C is the inner land-side or foot, which are made in one piece. The standard B is made with a lateral curve, as shown in Fig. 8, which brings its upper end, to which the beam D is attached, over the central line of the plow, to enable the beam to be adjusted to cause the plow to take and leave land, and to be adjusted for using two or three horses. The rear end of the beam is bolted to a slotted and roughened bar, E, attached to the handles F, so that the said beam can be readily adjusted, and when adjusted will be held securely in place. The handles F are connected by rounds in the usual way, and their lower ends are bolted to the mold-board A and the foot C. G is the land-side, which is secured to the foot C and mold-board A by bolts and lugs. H is the share, which is made reversible, and with one edge smooth and the other serrated, and is bolted to the mold-board A. I is the point, which is made reversible, is inserted in a cavity formed to receive it between the foot C and mold-board A, with its inner end extending along the inner side of said foot C, and is secured in place by a bolt. J is an arm, the inner side of the rear end of which is so formed as to fit firmly aginst the land-side of the upper part of the standard B, and is secured to said standard by a bolt. The end of the arm J has shoulders formed upon it to rest against the forward and rear edges of the standard B, and receive the strain to relieve the bolt from said strain. The arm J is bent outward, upward, forward, and downward, and its end part is made straight, and is inclined inward and forward to bring it in line with the colter of the plow. The straight part of the arm J has a shoulder or flange, $j'$, formed along its rear edge, for the edge of the shank K to rest against. Upon the lower end of the shank K is formed a seat for the skiver L, which is secured to said shank by a bolt. The skiver L is concaved, is made oval or spoon-shaped, is set in an inclined or diagonal position, and has its forward edge made straight and in line with the colter of the plow. The skiver L is made alike at both ends, so that it may be conveniently reversed.

With this construction the skiver L cuts a smooth clean groove or channel, and throws the soil and rubbish in front of the turning furrow-slice, so that it will be covered by said slice.

The straight part of the arm J and the upper part of the shank K have a number of holes formed in them to receive the fastening bolt, so that the skiver may be adjusted higher or lower, as may be desired.

By this construction the plow-beam may be adjusted without affecting the position of the skiver, and a large space will be left beneath and in the rear of the arm J to allow rubbish to pass off freely.

If desired, a jointer may be attached to the shank K, or the shank may be detached and a colter attached to the straight part of the arm J.

Having thus described my invention, what

I claim as new, and desire to secure by Letters Patent, is—

1. In plows, an arm whose rear end is rigidly attached to standard, and the front end adapted to receive a skiver, colter, or jointer adjustably, as shown and described.

2. The skiver L, connected with standard B by shank K and arm J, the former adjustable on the latter, and both constructed as shown and described.

JACOB HECKENDORN.

Witnesses:
RICHARD BEAHAN,
JOHN FINNEGAN.